(No Model.)
H. W. PELL.
SPRING COUPLING FOR VEHICLES.
No. 303,662. Patented Aug. 19, 1884.
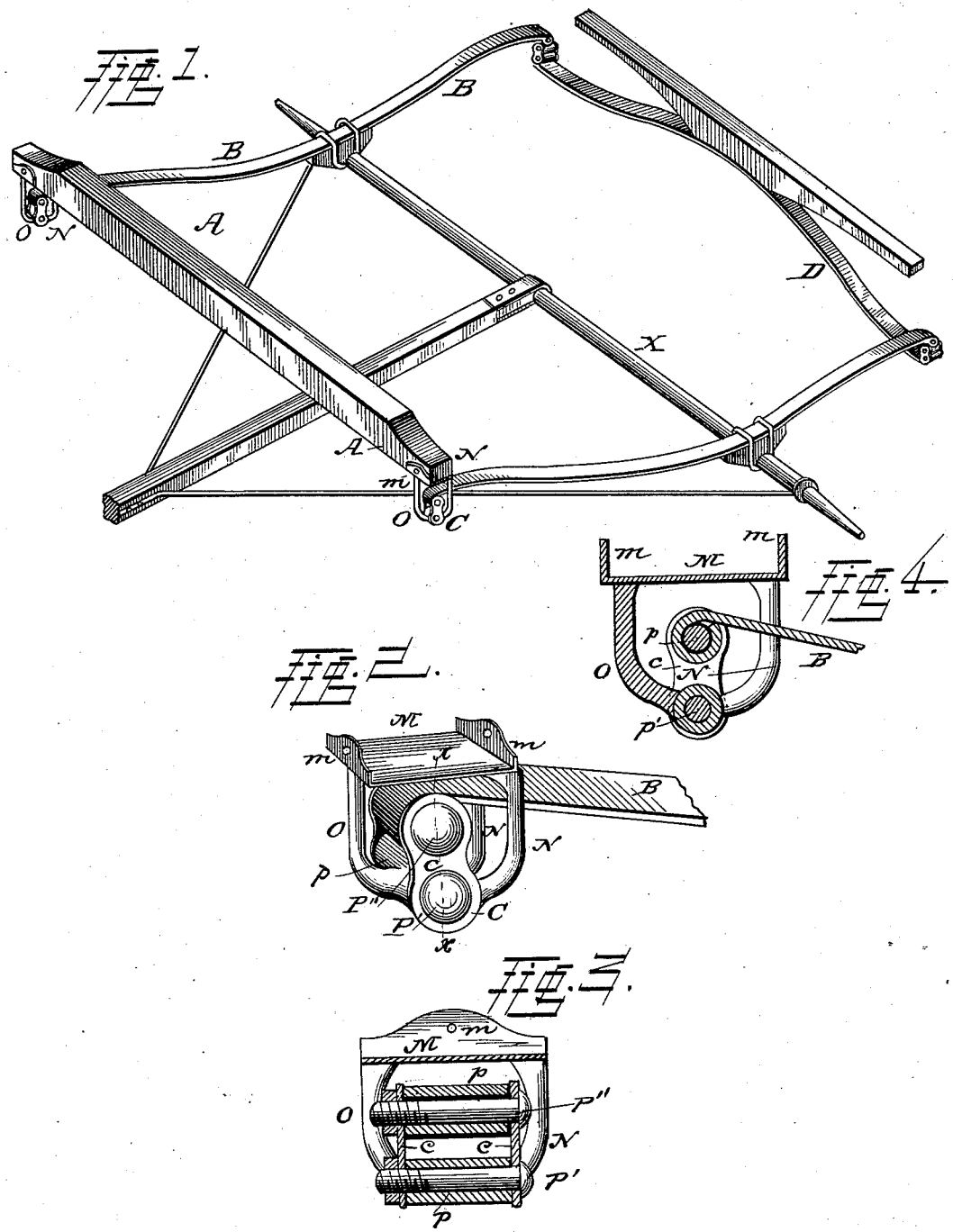
WITNESSES:
Fred. G. Dieterich.
J. H. McDonald.
INVENTOR.
Henry W. Pell
by W. J. Johnston
ATTORNEY

UNITED STATES PATENT OFFICE.

HENRY W. PELL, OF ROME, NEW YORK.

SPRING-COUPLING FOR VEHICLES.

SPECIFICATION forming part of Letters Patent No. 303,662, dated August 19, 1884.

Application filed April 11, 1884. (No model.)

*To all whom it may concern:*

Be it known that I, HENRY W. PELL, a citizen of the United States, residing at Rome, in the county of Oneida and State of New York, have invented certain new and useful Improvements in Spring-Couplings for Vehicles; and I do hereby declare the following to be a full, clear, and exact description of the invention, such as will enable others skilled in the art to which it appertains to make and use the same.

My invention relates to means for coupling springs to vehicles by which the elongation or contraction of the spring is compensated for.

The construction and operation of the several parts will be hereinafter more fully set forth in the specification and pointed out in the drawings, in which—

Figure 1 is a perspective view of the side springs of a vehicle secured to the cross-bar and cross-spring. Fig. 2 is a side elevation of the spring-coupling. Fig. 3 is a cross-section of same, and Fig. 4 is a transverse section of the coupling and spring.

The object of my invention is to obviate the difficulty and objections arising from the extension and elongation and contraction or shortening of springs, and more particularly to lateral springs of wagons, especially such as have a reach.

Referring more particularly to the drawings, the side springs, B, are secured at one end to the cross-spring D, and the other end to a coupling, C, of the following construction: The cross-bar A rests on a plate, M, provided with lugs $m$, perforated to receive a suitable bolt or pin, which passes through the end of the bar and the lugs. Depending from the plate M on one side is a curved arm, O, and from the opposite side two similarly-shaped arms, N N, are formed, which, together with the arm O, are integral with the plate M and unite at their bottom ends to form a cylindrical hollow bearing, P. At each side of this cylindrical bearing P are secured by a bolt, P', which passes through said plates and bearing, vertically-arranged plates or connections $c\ c$, carrying at their top ends a bolt, P'', which forms the pintle for the leaf of the spring B, the end $p$ of which is bent around said bolt, as shown in Fig. 4. The spring passes through or between the arms N, and thus is prevented from slipping or moving laterally. The end arm, O, prevents the spring being pushed out in rear.

It is well known that vehicle-springs when subjected to weight or pressure are straightened or elongated, and in the case of wagons act upon the axle so as to displace and endanger the coupling with the axle and push upon the king-bolt, often breaking it, and sometimes tear off or loosen the cross-bar of the wagon holding the spring. In my device the coupling is rigidly and securely attached to the cross-bar A, while the spring is free to move between the rollers P. Suppose the spring to be extended by pressure in the direction of its length, the rollers P turn and compensate for the strain, allowing the spring to yield gradually, and therefore prevent them from breaking, which would be the case if the springs were rigidly secured at their ends. When the strain is removed and the springs resume their normal state, the rollers P allow the springs to return. In this way, no matter how often or sudden the elongation and contraction, there is an instant response to such action by means of the rollers. The coupling may be secured to the cross-bar as described, or by a loop slipped on the end of the cross-bar, or in any other suitable manner.

Having thus described my invention, what I claim is—

The coupling for vehicle-springs herein described, composed of the flanged plate M $m$, front depending arm, O, and rear depending arms, N N, formed as an integral part with said plate and united at the lower ends into a cylindrical hollow bearing, P, combined with the vertically-arranged side plates, $c\ c$, secured by the bolt P', and bolt P'', connecting the plates $c\ c$ at their top ends and receiving the end of the spring which is bent around the same, substantially as and for the purposes set forth and shown.

In testimony whereof I affix my signature in presence of two witnesses.

HENRY W. PELL.

Witnesses:
C. D. PRESCOTT,
M. D. BARNETT.